United States Patent [19]

Bice et al.

[11] Patent Number: 5,045,388

[45] Date of Patent: Sep. 3, 1991

[54] PROCESS FOR MAKING COMPOSITES OF STRETCH BROKEN ALIGNED FIBERS AND PRODUCT THEREOF

[75] Inventors: Archie R. Bice, Landenberg, Pa.; David H. Edison, Hockessin, Del.; Floyd H. Fish, Jr., Centreville, Del.; Mark W. Hopkins, Newark, Del.; Richard K. Okine, Wilmington, Del.

[73] Assignee: E. I. Du Pont de Nemours & Company, Wilmington, Del.

[21] Appl. No.: 560,863

[22] Filed: Jul. 31, 1990

Related U.S. Application Data

[62] Division of Ser. No. 344,973, Apr. 26, 1989.

[51] Int. Cl.[5] .......................... B32B 5/08; B32B 5/12; B32B 31/20

[52] U.S. Cl. .................................. 428/294; 428/113; 428/338; 428/339; 428/408; 428/902

[58] Field of Search ............... 428/294, 338, 339, 408, 428/902

[56] References Cited

U.S. PATENT DOCUMENTS 3,864,184  2/1975  Crandall et al. ................... 156/180
4,759,985  7/1988  Armiger et al. .................... 428/367

*Primary Examiner*—James C. Cannon

[57] ABSTRACT

A stretch broken fiber reinforced resin tow is formed from resin reinforced with continuous filaments by tensioning the tow while heating it to a temperature sufficient to soften the resin in the tensioning zone to break all of the filaments in a random manner.

11 Claims, 1 Drawing Sheet

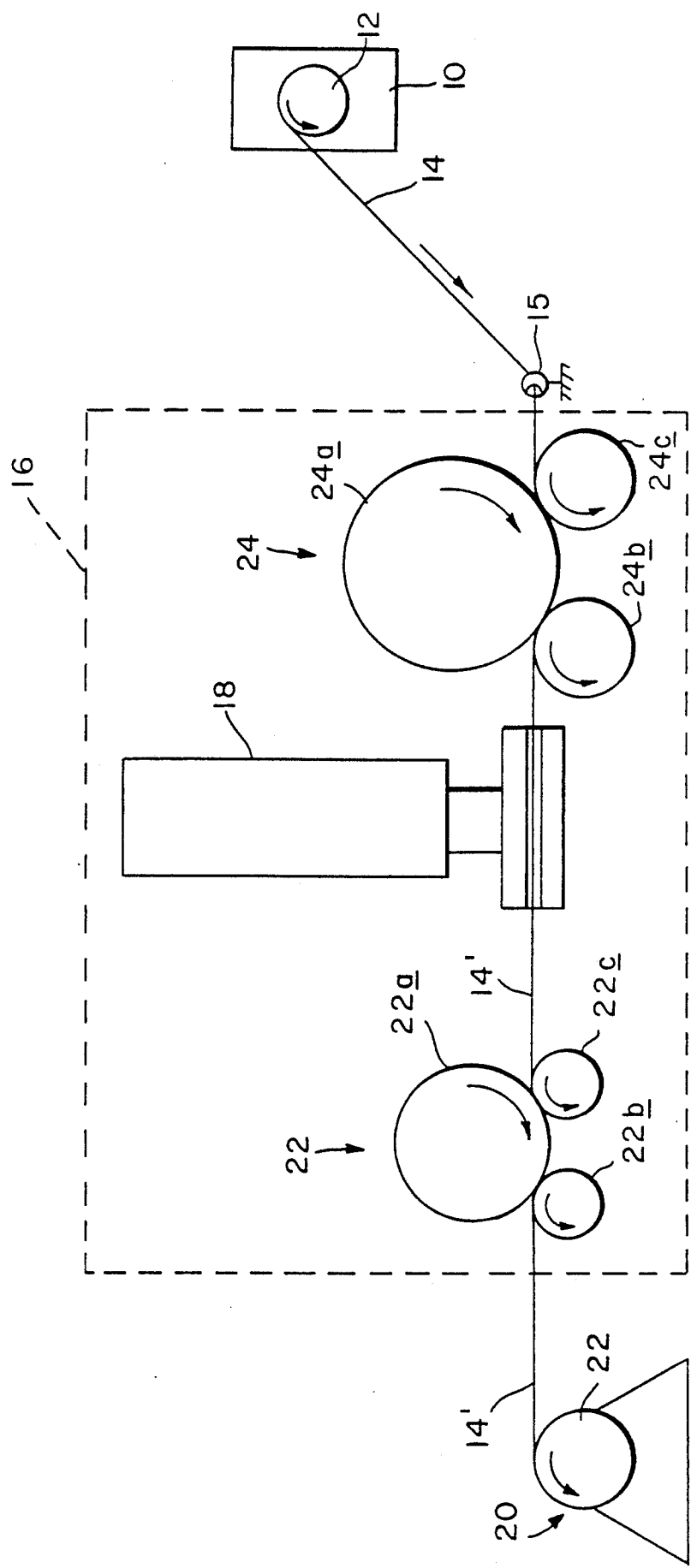

PROCESS FOR MAKING COMPOSITES OF STRETCH BROKEN ALIGNED FIBERS AND PRODUCT THEREOF

This is a division of application Ser. No. 07/344,973, filed 4-26-89.

BACKGROUND OF THE INVENTION

This invention relates to a process for making a composite of a resin matrix reinforced with stretch broken fibers and the product thereof.

U.S. Pat. No. 4,759,985, granted July 26, 1988, of common assignee discloses a variety of methods for forming a composite of a resin matrix reinforced with stretch broken fibers such as winding a stretch broken sliver on a frame covered with a film of thermoplastic resin to form a warp. The warp of stretch-broken sliver, however, can be made by any technique known to those skilled in the art, e.g., by creeling or beaming. A preform is obtained when another film of thermoplastic resin is placed over the warp to form a sandwich which is heated in a vacuum bag and then removed from the frame. Several of such preforms may be stacked while offset to provide multi-directionality and then the stack may be heated under pressure to form a composite structure.

Other techniques for applying matrix polymer include sprinkling of powdered resin on the sliver warp followed by heating to melt the resin, flowing liquid resin over the sliver warp, intermingling thermoplastic fiber with the sliver warp and then heating to melt the thermoplastic fiber thereby forming the matrix resin, calendering the warp between layers of matrix film, etc.

The composites formed are useful for deep drawing purposes with little sacrifice of strength and stiffness as compared to composites formed from resin reinforced with continuous filaments. However, in U.S. Pat. No. 4,759,985, the fibers do translate considerable distances. Draft ratios for this process typically run 200-300%. This high degree of translation creates the chance for alignment to be lost and a waviness becomes apparent on the surface of the tow. Finishes are applied to the yarn to reduce static, and to provide some cohesiveness to keep filaments from flying away. But, finish acts only as a weak damper for the energy released by the fiber when it breaks; much of this recoil energy is eventually dissipated by fiber movement resulting in misalignment.

SUMMARY OF THE INVENTION

The present invention provides an improved process for making a composite of a resin matrix reinforced with stretch broken fibers and comprises the steps of feeding a thermoplastic resin matrix tow reinforced with continuous filament fibers into a tensioning zone then heating the tow in the tensioning zone to soften the thermoplastic resin while tensioning the tow sufficiently to break all of the continuous filament fibers in a random manner and finally cooling the tow.

Formable planar and shaped non-planar composites are contemplated by the present invention. For the formable composites, that is, those composites that can be formed into shaped non-planar three-dimensional structures at elevated temperatures (where necessary), matrix resins of the thermoplastic variety may be employed. Suitable thermoplastic resins include polyesters (including copolyesters), e.g., polyethylene terephthalate, Kodar ® PETG copolyester 6763 (Eastman Kodak); polyamides, e.g., nylon 6,6; polyolefins, e.g., polypropylene; also included are the high temperature resins such as an amorphous polyamide copolymer based upon bis(para-aminocyclohexyl)methane, a semi-crystalline polyamide homopolymer also based on bis(para-aminocyclohexyl)methane, and polyetheretherketone. Fibers such as glass, carbon and aramid are popular as reinforcement fibers.

The ratio of reinforcement fibers to matrix can vary, but preferably is between 40% to 75% by volume. The average fiber lengths also may vary but preferably range from about ½ to about 6 inches in length with a random overlap distribution. About 95 percent of the fibers are aligned within ±5 degrees, and about 97 percent of the fibers are within ±10 degrees of the axial direction.

In the present invention the high degree of alignment inherent in the fiber spinning process is preserved to a very high degree; it can even be enhanced by this process. The molten resin, which surrounds each filament at the time it is broken, acts as a damper to absorb the energy released by the fiber as it breaks. The resin catches the fiber, this minimizes the conversion of recoil energy into energy which disorients the filaments. The energy is converted to heat by the resin and rapidly convected and radiated away to safety. The draft required to break fibers using this process is much lower than for dry fibers. A draft of 10% is sufficient to break fibers which have break elongations as high as 4%. In one sense, the process is very efficient since low draft settings provide complete breakage of the tow bundle, i.e. each filament breaks. This results in part from the good grip that the breaker rolls have on the tow. This minimization of fiber movement reduces the opportunities for the filaments to become misaligned. The highly viscous, molten thermoplastic resins, make excellent damping pots. The process is also good because the resin is molten for such a short period of time (<2 seconds). This limits the time in which the fibers may move relative to one another. The tow is heated just before the breaking is to occur, and is cooled immediately afterward.

Because the fibers are surrounded by molten polymer during the stretch breaking step, very little fly is generated. The tow is highly useful in downstream processing because the resin keeps the tow bundle contiguous even under high tension. Thus, the tow can be woven into fabrics or filament wound with effort similar to the processing of continuous filament materials.

BRIEF DESCRIPTION OF THE DRAWING

The drawing is a schematic illustration of an apparatus for practicing the process of the present invention.

DETAILED DESCRIPTION OF THE ILLUSTRATED EMBODIMENT

Referring to the drawing, the preferred embodiment generally includes a creel 10 holding a rotatable bobbin 12 of a tow 14 made of a resin matrix reinforced with continuous filament fibers, a stretch breaking machine 16 (Model 770 Rebreaker, Seydel, Bielefeld, Germany) with an integral hot air heater 18 (6 KW shell-in-tube heater by Sylvania) and a windup 20 (Model 959 Leesona Corporation, Warwick, R.I.) for winding a package 22. The stretch breaking machine 16 includes two breaker block units 22, 24. Unit 22 consists of driven roll 22a engaging and forming successive nips with ceramic coated metal rolls 22b and 22c which are water cooled. Roll 22a is covered with elastomer (Adiprene, L-325, 5/16" thick Shore D hardness of 75 applied by Standard Engineering, Wilmington, Del.). In a similar arrangement driven elastomer covered roll 24a engages and forms nips with ceramic coated metal rolls 24b and 24c. Roll 24a is covered with elastomer (54557 11/16" thick Shore D hardness of 42 applied by Smoke Mobely, Washington, D.C.).

In operation the continuous filament fiber reinforced tow 14 is drawn from package 12 on creel 10 through guide 15 by means of driven roll 24a in conjunction with nip rolls 24b and 24c. The tow is pulled through heater 18 by means of driven roll 22a and associated nip rolls 22b and 22c. Roll 22a is driven at a higher speed (about 10 percent faster) than roll 24a to tension the tow. The conversion of the tow 14 into stretch broken aligned fiber reinforced resin tow 14' occurs between rolls 22a and 24a. The tow 14 passes between the nips formed between rolls 24a, 24b and 24c which grip the tow. The tow is then pulled through heater 18 which softens the resin by raising its temperature to about its melting point. Since the speed of roll 22a is faster than roll 24a a tension is created in the tow between the rolls which is sufficient to break each of the continuous filaments in the tow between rolls 22a and 24a. Because the resin is soft the filaments do not transfer the shear load through the resin to adjacent filaments and because no shear load is transferred the continuous filaments break randomly instead of all in one location. This random break distribution allows the tow 14' to remain continuous without separating. The resin cools rapidly after leaving heater 18 and is rapidly cooled when moved over water cooled rolls 22b and 22c which are at a temperature of about 50° F. The stretch broken tow is then wound into package 22 on winder 20 for further processing.

EXAMPLE I

One bobbin of 3700 denier continuous filament fiber reinforced resin tow was stretch broken using an apparatus as shown in the drawing. The tow was made up of two yarns of 1150 denier aramid yarn (Kevlar® 49 aramid, Du Pont) impregnated with PETG resin (Kodar® PETG copolyester 6763, Eastman Kodak). The resin includes 2% by weight carbon black (Ampacet). The tow is about 57% fiber on a volume basis.

The stretch break machine 16 was prepared by setting the center lines of rolls 22c and 24b 7.25 inches apart. The surface speed of roll 24a was adjusted to 11.8 meters/min and the surface speed of roll 22a was 13.0 meters/min. Chilled water at about 40° F. was circulated through rolls 22a and 22c. The right hand edge of the hot air gun nozzle was placed 6.75 inches from the center line of roll 22c and its output temperature was about 650° F. Room temperature air was fed to the gun at the rate of 10 cubic feet per minute. The stretch broken tow from stretch break machine is wound continuously into a package on the winder 20. The final denier of the tow is 3300.

A warp of the tow was prepared by wrapping the tow from its package, 2 layers of 12 ends to the inch on a 18 inch square stainless steel plate 1/16" thick. The entire plate was vacuum bagged in an oven for 1 hour at 200° C. The product, called a prelam, was now a well impregnated, relatively stiff prelam of stretch broken fiber and resin with the fibers all aligned in one direction. The prelams were 12 mils thick.

Six prelams were cut to 5"×12" rectangles (fiber axes parallel to the 12" sides). The prelams were stacked on top of each other in a mold. The mold was placed in a press and cured under 300 psi pressure per square inch of composite at a temperature of 200° C. for 20 minutes. The press was then cooled to 55° C. temperature and the 5"×12" composite rectangle was removed. The rectangle was about 56 mils thick.

The rectangle was cut into pieces each 0.5" wide and 12" long. The sample was sandblasted at 40 psi, 2 passes at both sides of both ends (last 1⅞"). Aluminum tabs (⅛" thick, 9/16" wide, 2" long) were glued to the sample (using Devcon "F" epoxy). The tabs and bars were placed in a tabbing frame and cured overnight. Nine samples were tested according to ASTM method D3039-76 entitled. "Standard Test Method for Tensile Properties of Fiber-Resin Composites." The average tensile modulus of the samples was 10.4 million psi. The average tensile strength was 172 thousand psi.

EXAMPLE II

One bobbin of 3580 denier continuous filament fiber reinforced resin tow was stretch broken using an apparatus as shown in the drawing. The tow was made up of two yarns of 1150 denier aramid yarn (Kevlar® 49 aramid, Du Pont) impregnated with resin (an amorphous polyamide copolymer based on bis(para-aminocyclohexyl) methane). The tow is about 60% fiber on a volume basis.

The stretch break machine 16 was prepared by setting the center lines of rolls 22c and 24b 8.0 inches apart. The surface speed of roll 24a was adjusted to 5.5 meters/min and the surface speed of roll 22a was 6.0 meters/min. Chilled water at about 40° F. was circulated through rolls 22a, 22b and 22c. The right hand edge of the hot air gun nozzle was placed 6.75 inches from the center line of roll 22c and its output temperature was about 700° F. Room temperature air was fed to the gun at the rate of 12 cubic feet per minute. The right hand edge of the gun nozzle is 6.75" from the center line of roll 22c. The stretch broken tow from stretch break machine is wound continuously into a package on the winder 20. The final denier of the tow is 3260.

A photomicrograph of the surface of the composite tow (enlarged 100×) was prepared. The tow samples were plasma etched at 50 Watt in 0.5 torr of Oxygen for 5 minutes. The samples were then coated with gold and photographed using the JEOL 840 SEM at 100× magnification.

The orientation of the filaments was determined. After the photomicrographs were obtained, the micrographs were photocopied to enhance the contrast between the filaments. The photocopy was then taped to a digitizing pad (model DIGI-PAD5 made by GTCO Corporation, 1055 First Street, Rockville, Md. 20850). The digitizing pad was connected to a PC (made by IBM). A program was created in the PC to accept and process the data. The orientation of each filament was entered into the computer by placing the crosshairs of the mouse (a moveable part of the digitizing pad) over opposite ends of each filament in the photocopy (photocopies contained between 72 and 99 filaments each) and entering the location of each end by pressing a button on the mouse. After entering all the filaments on the photocopy, the PC was used to organize each data set, each photocopy, separately. The computer determined the angle of each filament relative to the digitizing pad by comparing the locations of opposite ends of each filament. The angles were sorted from the most negative to the most positive. Then, the angles were "normalized" so that the mean angle was 0 degrees, to correct for misalignment in taping the pictures to the digitizing pad. This normalizing was done by adding a constant to each angle. The number of filaments included within any angle was now determined by examining the data and tabulating the results. This process could also be done by using a protractor to measure the angles.

95.5 percent of the fibers were parallel to the axial direction of the tow within an angle of + or −5 degrees and 97.0 percent were within + or −10 degrees of the axial direction.

EXAMPLE III

One bobbin of 2670 denier continuous filament reinforced resin tow was stretch broken using an apparatus as shown in the drawing. The tow was made up of one carbon fiber yarn (3K, AS-4W carbon fiber, Hercules) impregnated with resin (an amorphous polyamide copolymer based on bis(para-aminocyclohexyl) methane). The tow product is available from Du Pont. The tow is about 65% fiber on a volume basis.

The stretch break machine 16 was prepared by setting the center lines of rolls 22c and 24b 8 inches apart. The surface speed of roll 24a was adjusted to 3.6 meters/min and the surface speed of roll 22a was 4.0 meters/min. Chilled water at about 40° F. was circulated through rolls 22a, 22b and 22c. The right hand edge of the hot air gun nozzle was placed 6.75 inches from the center line of roll 22c and its output temperature was about 600° F. Room temperature air was fed to the gun at the rate of 12 cubic feet per minute. The stretch broken tow from stretch break machine is wound continuously into a package on the winder 20. The final denier of the tow is about 2400.

A photomicrograph of the surface of the composite tow (enlarged 100×) was prepared. The tow samples were plasma etched at 50 Watt in 0.5 torr of Oxygen for 15 minutes. The samples were then coated with gold and photographed using the JEOL 840 SEM at 100× magnification using secondary electron imaging at 15 kV.

The orientation of the filaments was determined. After the photomicrographs were obtained, the micrographs were photocopied to enhance the contrast between the filaments. The photocopy was then taped into a digitizing pad (model DIGI-PAD5 made by GTCO Corporation, 1055 First Street, Rockville, Md. 20850). The digitizing pad was connected to a PC (made by IBM). A program was created in the PC to accept and process the data. The orientation of each filament was entered into the computer by placing the crosshairs of the mouse (a moveable part of the digitizing pad) over opposite ends of each filament in the photocopy (photocopies contained between 43 and 59 filaments each) and entering the location of each end by pressing a button on the mouse. After entering all the filaments on the photocopy, the PC was used to organize each data set, each photocopy, separately. The computer determined the angle of each filament relative to the digitizing pad by comparing the locations of opposite ends of each filament. The angles were sorted from the most negative to the most positive. Then, the angles were "normalized" so that the mean angle was 0 degrees, to correct for misalignment in taping the pictures to the digitizing pad. This normalizing was done by adding a constant to each angle. The number of filaments included within any angle was now determined by examining the data and tabulating the results. This process could also be done by using a protractor to measure the angles.

92.8 percent of the fibers were parallel to the axial direction of the tow to within an angle of + or −5 degrees and 95.6 percent were within + or −10 degrees of the axial direction.

EXAMPLE IV

One bobbin of 9,840 denier continuous filament fiber reinforced resin tow was stretch broken using an apparatus as shown in the drawing. The tow was made up of one glass roving (E-glass, 6620 denier, #473CB675 Type 30 roving, Owens Corning Fiberglass, 900 West Valley Road, Wayne, Pa. 19807) impregnated with resin (PETG, Kodar PETG copolyester 6763, Eastman Kodak). The resin includes 2% by weight carbon black (Ampacet). The tow is about 50% fiber by volume.

The stretch break machine 16 was prepared by setting the center lines of rolls 22c and 24b 8.0 inches apart. The surface speed of roll 24a was adjusted to 4.5 meters/min and the surface speed of roll 22a was 5.0 meters/min. Chilled water at about 40° F. was circulated through rolls 22a, 22b and 22c. The right hand edge of the hot air gun nozzle was placed 6.75 inches from the center line of roll 22c and its output temperature was about 700° F. Room temperature air was fed to the gun at the rate of 12 cubic feet per minute. The stretch broken tow from stretch break machine is wound continuously into a package on the winder 20. The final denier of the tow is about 8860.

Photomicrographs of the surface of the composite tow (enlarged 100×) were prepared by photographing the surface of the tow through an optical microscope. Twelve photomicrographs were prepared.

The orientation of the filaments was determined. After the photomicrographs were obtained, the micrographs were photocopied to enhance the contrast between the filaments. The photocopy was then taped onto a digitizing pad (model DP5A-1111A, made by GTCO Corporation, 1055 First Street, Rockville, Md. 20850). The digitizing pad was connected to a PC (made by IBM). A program was created in the PC to accept and process the data. The orientation of each filament was entered into the computer by placing the crosshairs of the mouse (a movable part of the digitizing pad) over opposite ends of each filament in the photocopy (photocopies contained between 34 and 68 filaments each) and entering the location of each end by pressing a button on the mouse. After entering all the filaments on the photocopy, the PC was used to organize each data set, each photocopy, separately. The computer determined the angle of each filament relative to the digitizing pad by comparing the locations of opposite ends of each filament. The angles were sorted from the most negative to the most positive. Then, the angles were "normalized" so that the mean angle was 0 degrees to correct for misalignment in taping the pictures to the digitizing pad. This normalizing was done by adding a constant to each angle. The number of filaments included within any angle was now determined by examining the data and tabulating the results. This process could also be done by using a protractor to measure the angles.

95.6 percent of the fibers were parallel to the axial direction of the tow to within an angle of + or −5 degrees and 96.1 percent were within + or −10 degrees of the axial direction.

We claim

1. A tow of a matrix resin reinforced with substantially axially aligned fibers broken in a random manner from a process of: feeding a thermoplastic resin matrix tow reinforced with continuous filament fibers into a tensioning zone; heating said tow in said tensioning zone to soften said thermoplastic resin while tensioning said tow sufficiently to break all of said continuous filament fibers in a random manner; and cooling said tow.

2. The tow of claim 1 wherein said continuous filament fibers are aramid fibers.

3. The tow of claim 1 wherein said continuous fibers are glass fibers.

4. The tow of claim 1 wherein said continuous filament fibers are carbon fibers.

5. The tow of claim 1 wherein the ratio of reinforcement fibers to matrix resin is from about 40 to about 75% by volume.

6. The tow of claim 1 wherein the broken fiber lengths range from about ½ inch to about 6 inches.

7. The tow of claims 1, 2, 3, 4, 5 or 6 wherein 95% of said fibers are within ±10 degrees of being axially aligned.

8. The tow of claims 1, 2, 3, 4, 5 or 6 wherein about 93% of said fibers are within ±5 degrees of being axially aligned.

9. A compression molded article from the tow of claims 1, 2, 3, 4, 5 or 6.

10. A compression molded article from the tow of claim 9.

11. A compression molded article from the tow of claim 8.

* * * * *